United States Patent [19]

Sugimoto

[11] 4,016,787

[45] Apr. 12, 1977

[54] METHOD FOR CONTROLLING THE CUTTING FEED SPEED OF A SAW FRAME OF BAND-SAWING MACHINE OR SIMILAR MACHINE

[75] Inventor: Tadahiro Sugimoto, Amagasaki, Japan

[73] Assignee: Daitoseiki Co. Ltd., Osaka, Japan

[22] Filed: June 20, 1975

[21] Appl. No.: 588,952

Related U.S. Application Data

[62] Division of Ser. No. 529,105, Dec. 3, 1974, Pat. No. 3,991,644.

[30] Foreign Application Priority Data

Dec. 4, 1973  Japan .......................... 48-136663
Mar. 11, 1974  Japan .......................... 49-28346

[52] U.S. Cl. ........................................ 83/13; 83/72; 83/800; 83/756
[51] Int. Cl.² ..................... B26D 5/04; B23D 53/04
[58] Field of Search ................ 83/800, 72, 370, 13, 83/76, 73, 756

[56] References Cited

UNITED STATES PATENTS

| | | | |
|---|---|---|---|
| 2,452,211 | 10/1948 | Rosenthal | 83/575 X |
| 2,601,576 | 6/1952 | Wells et al. | 83/800 |
| 2,649,646 | 8/1953 | Remmen | 83/72 |

Primary Examiner—Donald R. Schran
Attorney, Agent, or Firm—Wenderoth, Lind & Ponack

[57] ABSTRACT

A method of controlling the cutting feed speed of a saw frame of a band-sawing machine or a similar machine, whereby the change of cutting resistance to the saw blade is detected as a change in pressure of an oil pressure cylinder supporting the saw frame and by transforming such change into a voltage change by means of a piezoelectric element, the flow rate of a flow control valve provided in the pressure oil discharge circuit of the oil pressure cylinder is controlled by said detected voltage or the like and thereby the cutting feed speed is changed in response to the change of cutting resistance so as to maintain the cutting resistance to the saw frame at an optimum.

2 Claims, 4 Drawing Figures

METHOD FOR CONTROLLING THE CUTTING FEED SPEED OF A SAW FRAME OF BAND-SAWING MACHINE OR SIMILAR MACHINE

This is a division of application Ser. No. 529,105, filed Dec. 3, 1974, now U.S. Pat. No. 3,991,644, issued Nov. 16, 1976.

This invention relates to a method for controlling the cutting feed speed of a saw frame. More particularly, this invention provides a method whereby cutting resistance to a saw blade during cutting is detected electrically in order to control the cutting feed speed of a saw frame automatically by means of a voltage, detected and thereby maintain the cutting resistance to a saw blade uniform.

In the conventional band sawing machine or similar machine, the cutting feed speed of a saw frame is effected by supporting the weight of a saw frame itself by an oil pressure cylinder and by discharging pressure oil contained in the cylinder little by little. The cutting feed speed of a saw frame is kept almost constant by the set flow rate of a flow control valve, regardless of load applied to the saw blade. Therefore, in the case where material to be cut is H-section steel, for example, there is a difference in the length of the cut between the central portion with a large width and the other portions with a small width and if the fixed cutting feed is applied to such material, excessive load is applied to the saw blade at the portion with a large length of cut, with the result of breakage of sawteeth or the saw blade. In order to prevent such trouble, it is the usual practice to adjust the flow control valve so that the saw frame may descend at such a speed that it does not cause breakage of the saw blade at the portion of a large width of material to be cut. This, however, involves a disadvantage that the saw frame descends at a slower speed than is possible at the portion where resistance is smaller and as a result, cutting efficiency is lowered.

In view of the above disadvantage, the present invention has for an object to change the cutting feed speed of the saw frame automatically in response to the change of cutting resistance to the saw blade so as to ensure the optimum cutting.

The nature and advantage of the present invention will be understood more clearly from the following description made with reference to the accompanying drawings, in which.

Figure 1:
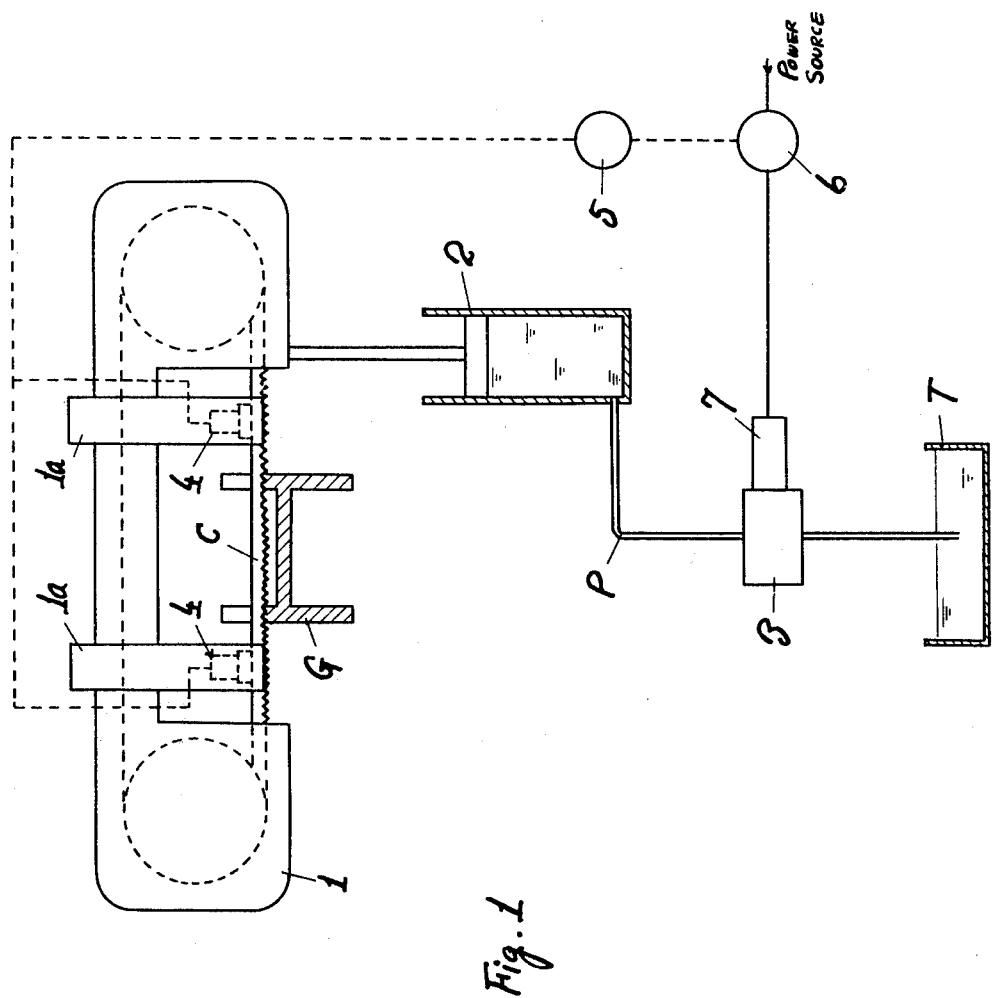
FIG. 1 is a diagram of an embodiment of the present invention which controls the cutting feed speed of a saw frame by detecting the change of load applied to the back of a band saw blade.
Figure 2:
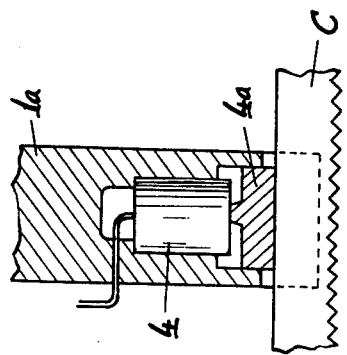
FIG. 2 is a cross sectional view of a piezo-electric element part of the embodiment shown in FIG. 1.

In the drawings, numeral 1 denotes a saw frame equipped with a band-saw blade C. Numeral 2 is an oil pressure cylinder by which the saw frame 1 is caused to rise or descend. Numeral 3 is a flow control valve, for example, a plunger type flow control valve, by which pressure oil is discharged from the oil pressure cylinder 2 in cutting operation. T is a tank for working oil which is discharged from the oil pressure cylinder 2 via an oil discharge pipe P and the flow control valve 3. A speed change motor 7 for regulating the flow rate is connected to the flow control valve 3. The above-mentioned saw frame 1 has two saw guides 1a to keep the saw blade C at a normal position. A shoe 4a is set inside the saw guide 1a and on the back of the band saw blade C. A piezo-electric element 4 or a similar element to detect the change of load as a change of voltage, is fixed to the saw guide 1a. The piezo-electric element 4 should have a characteristic such that the voltage detected is zero at the upper limit of load but is a maximum at no-load. This piezo-electric element 4 is generally provided at each of the saw guides 1a, but may be provided only at one of the saw guides. An amplifier 5 to amplify the detected voltage is connected to the piezo-electric element. Connected to the amplifier 5 is a motor controlling device 6 which controls the speed change motor 7 by amplified voltage. G in the drawing is material to be cut.

In the case where material G or H-section steel is cut by the above-mentioned apparatus, when cut portions having a small width, cutting resistance is small because the length of the cut is short. Therefore, the load applied to the back of the saw blade is small and consequently a small load is applied to the piezo-electric element, through the medium of a shoe 4a fitted in the saw guide. As the piezo-electric element generates a high detected voltage in response to the small load, such detected voltage is amplified by the amplifier and the amplified voltage, namely, a speed increase signal is transmitted to the motor controlling device 6, whereupon the speed change motor increases its speed, with the result that the flow control valve 3, a metering valve, etc. increase their r.p.m., which increases the quantity of pressure oil to be discharged from the oil pressure cylinder. In other words, the cutting feed speed of the saw blade C increases and cutting is effected with an optimum load on the saw blade C.

When cutting the central portion of H-section steel, it is only natural that cutting resistance becomes larger because of the increased length of cut and in consequence, a big load is applied to the back of the saw blade and to the piezo-electric element 4 through the shoe 4a. As this piezo-electric element 4 generates a low detected voltage in response to a big load, such low detected voltage is amplified by the amplifier 5 and a speed decrease signal is transmitted to the motor controlling device 6, whereupon the speed of the speed change motor 7 decreases, the r.p.m. of the plunger type flow control valve connected to the speed change motor 7 decreases, the quantity of pressure oil discharged from the oil pressure cylinder decreases, and the cutting feed speed of the saw frame 1 is reduced, with the result that cutting is effected with the optimum load on the saw blade C. Thus, the change of resistance to the saw blade is detected as a change of load on the back of the saw blade and is fed back to the cutting feed speed so as to make uniform the resistance applied to the saw blade and effect the optimum cutting.

Figure 3:
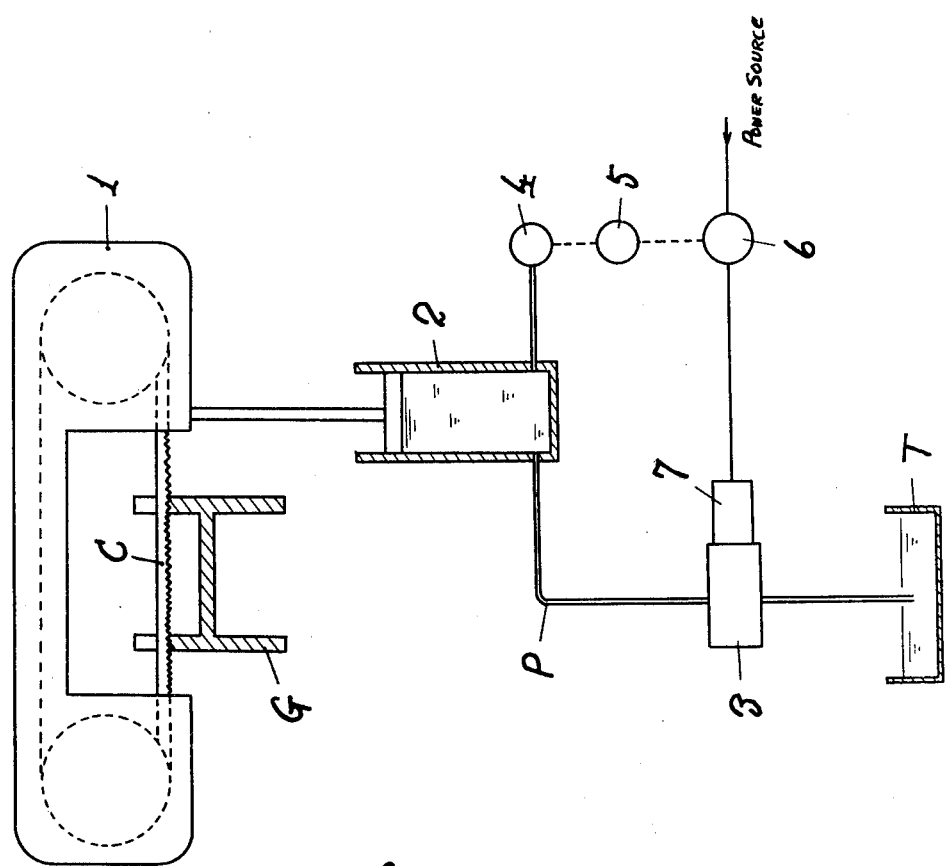
FIG. 3 shows another embodiment of the present invention, in which the change of oil pressure applied to the cylinder for moving vertically the saw frame is detected in order to control the cutting feed speed of the saw frame.

Shown in FIG. 3 is another embodiment of the present invention, in which the change of cutting resistance is detected as a change in oil pressure of the oil pressure cylinder for moving the saw frame, instead of as a change of load on the back of the band saw. In the embodiment of FIG. 3, the piezo-electric element which has a characteristic such that the voltage detected is a maximum at the upper limit of the oil pressure but is zero at the lower limit of the oil pressure, is provided in such a fashion that it is subjected to any change of the pressure of the oil pressure cylinder 2 which controls the descending of the saw frame. Similar to the embodiment in FIG. 1, the amplifier 5 and the speed change motor control device, etc, are connected to the piezo-electric element. In the embodiment of FIG. 3, in the case where H-section steel or material to be cut is cut, resistance of the saw blade becomes small when cutting the upper portion and the lower portion of G. At this time, the load of the saw frame 1 (weight of the saw frame itself) is applied almost entirely to the oil pressure cylinder 2, with the result that oil pressure inside the cylinder rises and applies a big pressure to the piezo-electric element 4. Since the piezo-electric element 4 in this embodiment generates a high detected voltage in response to a big pressure, such voltage is amplified by the amplifier 5 and the big amplified voltage, i.e., a speed increase signal, is transmitted to the motor controlling device 6, whereupon the speed change motor 7 increases its speed, the r.p.m. of the plunger type flow control valve 3 increases, the quantity of pressure oil to be discharged from the oil pressure cylinder increases, the cutting feed speed of the saw frame 1 becomes faster and thus the cutting operation is carried out with the optimum load on the saw blade C.

In the case where the length of the cut is longer, such as at the central portion of H-section steel, and resistance to the saw blade is higher, the load of the saw frame 1 is applied largely to the saw blade and the load applied to the oil pressure cylinder decreases and a smaller pressure is applied at the piezo-electric element 4. As the piezo-electric element 4 in this embodiment generates a small detected voltage in response to a small pressure, such detected voltage is amplified by the amplifier and the small amplified voltage, i.e., a speed decrease signal is transmitted to the motor controlling device 6, whereupon the speed of the speed change motor 7 decreases, the r.p.m. of the plunger type flow control valve 3 connected to the speed change motor decreases, the quantity of pressure oil to be discharged from the oil pressure cylinder 2 decreases, the cutting feed speed of the saw frame 1 decreases and the cutting operation is carried out with the optimum load on the saw blade C. Thus, a change of resistance to the saw blade is detected as a change of pressure of the oil pressure cylinder and is fed back to the cutting feed speed so as to make uniform the resistance applied to the saw blade and effect optimum cutting.

Figure 4:
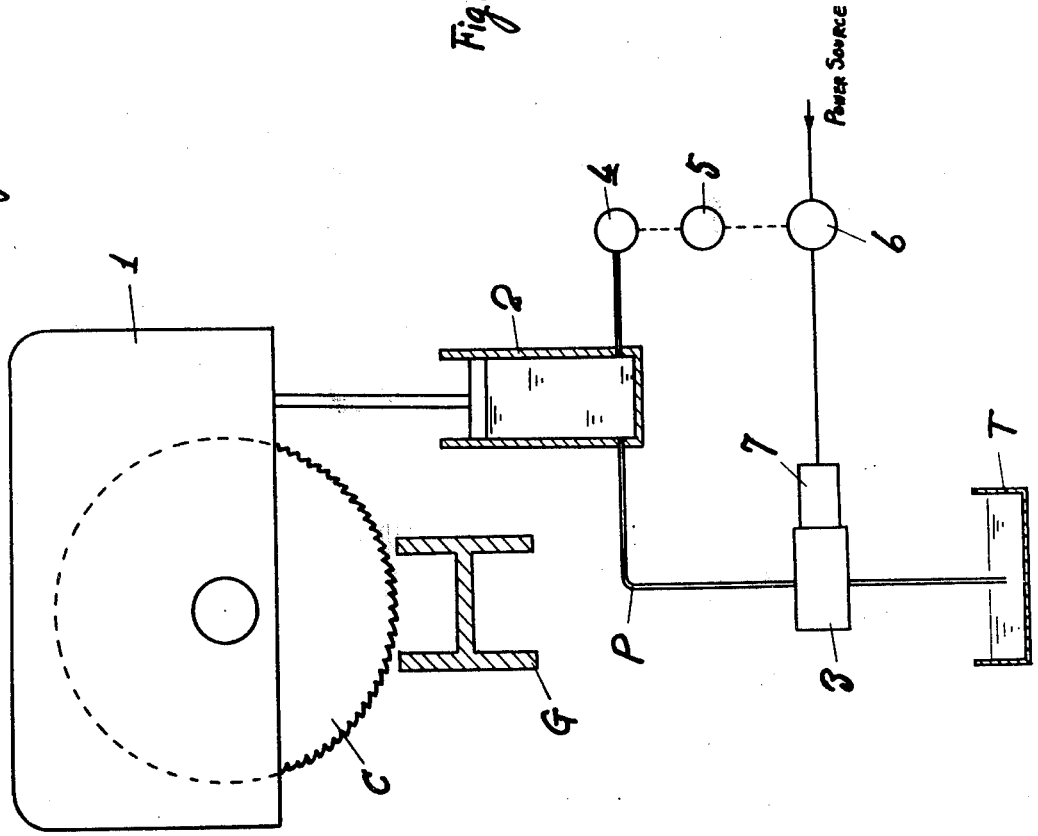
FIG. 4 shows still another embodiment, in which the present invention is applied to a circular saw.

The method for controlling the cutting feed speed of a saw frame according to the present invention can be applied to a circular saw, as shown by FIG. 4. In the embodiments of FIG. 1, FIG. 3 and FIG. 4, the same effect can be obtained by substituting for the flow control valve 3, the speed change motor 7 and the motor controlling device 6 a throttle type flow control valve, an electromagnetic valve shifter (electro-magnet, for example) and a shifter controlling device respectively. Furthermore, in the embodiments of FIGS. 1, 3 and 4, the detecting signal from the piezo-electric element 4 can be based on electric amperage or the like, instead of voltage.

According to the present invention, the apparatus is so designed that the flow control valve which causes the saw frame to descend in proportion to the degree of resistance to the saw blade is controlled. Therefore, it is possible to cut material of any shape at the optimum cutting speed without any unreasonable strain on the saw blade. In other words, the present invention has the advantages that it prevents the blade breakage and enhances cutting efficiency.

What is claimed is:

1. A method of controlling the cutting feed speed of a saw frame of a band-sawing machine, comprising detecting a change of cutting resistance to the saw blade by detecting a change of pressure in the oil pressure cylinder supporting the saw frame, transforming the change of pressure into a voltage change, and electrically driving a flow control valve provided in the pressure oil discharge circuit of the oil pressure cylinder which supports the saw frame in response to said detected voltage change for changing the cutting feed speed of the saw frame in response to the change of cutting resistance in order to maintain the cutting resistance to the saw blade at an optimum cutting resistance.

2. In combination with a band sawing machine having a vertically movable saw frame, a saw-blade mounted on said saw frame for continuous sawing, saw guides holding the saw blade therebetween, and an oil pressure cylinder for causing said saw frame to rise and descend and having an exhaust conduit, an apparatus for controlling the speed of descent of said saw frame comprising a load-voltage changing element connected to said oil pressure cylinder to detect the change of cutting resistance as a change of oil pressure in said oil pressure cylinder, an amplifier connected to said load-voltage changing element to amplify the detected voltage, a motor controlling device connected to said amplifier, a speed change motor coupled to said motor controlling device for being driven thereby and a flow control valve connected to said speed change motor and driven thereby, said flow control valve being connected in the exhaust conduit of said oil pressure cylinder for automatically regulating the quantity of the oil exhausted, thus changing automatically the speed of descent of the saw frame in response to the change of cutting resistance to effect cutting while keeping the cutting resistance uniform.

* * * * *